(12) United States Patent
Tamura et al.

(10) Patent No.: US 11,811,115 B2
(45) Date of Patent: Nov. 7, 2023

(54) METHOD OF DETERMINING DEGRADATION OF FUEL CELL STACK, AND FUEL CELL VEHICLE EQUIPPED WITH THE FUEL CELL STACK

(71) Applicant: HONDA MOTOR CO., LTD., Tokyo (JP)

(72) Inventors: Takuya Tamura, Wako (JP); Koji Moriyama, Torrance, CA (US); Manabu Iwaida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/216,725

(22) Filed: Mar. 30, 2021

(65) Prior Publication Data
US 2022/0320553 A1    Oct. 6, 2022

(51) Int. Cl.
| | |
|---|---|
| *H01M 8/04858* | (2016.01) |
| *H01M 8/04119* | (2016.01) |
| *H01M 8/04701* | (2016.01) |
| *H01M 8/04746* | (2016.01) |
| *H01M 8/10* | (2016.01) |
| *H01M 8/04537* | (2016.01) |
| *H01M 8/04664* | (2016.01) |
| *H01M 8/0438* | (2016.01) |

(52) U.S. Cl.
CPC ..... *H01M 8/04952* (2016.02); *H01M 8/0488* (2013.01); *H01M 8/0491* (2013.01); *H01M 8/0494* (2013.01); *H01M 8/04134* (2013.01); *H01M 8/04708* (2013.01); *H01M 8/04753* (2013.01); *H01M 2250/20* (2013.01)

(58) Field of Classification Search
CPC ......... H01M 8/04952; H01M 8/04134; H01M 8/04708; H01M 8/04753; H01M 8/0488; H01M 8/0491; H01M 8/0494; H01M 2250/20
USPC ......................................... 429/431
See application file for complete search history.

(56) References Cited

U.S. PATENT DOCUMENTS

| | | | | |
|---|---|---|---|---|
| 2008/0131741 | A1* | 6/2008 | Tabuchi | ........... H01M 8/04291 429/432 |
| 2010/0047644 | A1* | 2/2010 | Imamura | ........... H01M 8/04671 429/430 |
| 2012/0015271 | A1 | 1/2012 | Shigezumi et al. | |
| 2012/0028153 | A1 | 2/2012 | Shigezumi et al. | |
| (Continued) | | | | |

FOREIGN PATENT DOCUMENTS

| | | |
|---|---|---|
| CN | 102414897 | 4/2012 |
| CN | 102414899 | 4/2012 |
| (Continued) | | |

OTHER PUBLICATIONS

Chinese Office Action for Chinese Patent Application No. 202210155437.7 dated Sep. 8, 2023.

*Primary Examiner* — Christian Roldan
(74) *Attorney, Agent, or Firm* — AMIN, TUROCY & WATSON, LLP

(57) ABSTRACT

In a case where each of the temperature, the impedance, and the output current of a fuel cell stack falls within a predetermined range, the output voltage of the fuel cell stack is measured, and the measured output voltage is compared with a reference value to thereby determine the degree of degradation of the fuel cell stack.

5 Claims, 7 Drawing Sheets

(56) References Cited

U.S. PATENT DOCUMENTS

| | | | |
|---|---|---|---|
| 2012/0270127 A1* | 10/2012 | Paganelli | H01M 8/04559 |
| | | | 429/429 |
| 2013/0084510 A1 | 4/2013 | Masui et al. | |
| 2013/0149573 A1* | 6/2013 | Krupadanam | H01M 8/04753 |
| | | | 429/63 |
| 2013/0316257 A1 | 11/2013 | Mizuno et al. | |
| 2017/0324106 A1* | 11/2017 | Sinha | H01M 8/04753 |
| 2018/0108925 A1* | 4/2018 | Won | H01M 8/2457 |

FOREIGN PATENT DOCUMENTS

| | | |
|---|---|---|
| CN | 102959782 | 3/2013 |
| CN | 103299470 | 9/2013 |
| JP | 2006-351252 | 12/2006 |

* cited by examiner

METHOD OF DETERMINING DEGRADATION OF FUEL CELL STACK, AND FUEL CELL VEHICLE EQUIPPED WITH THE FUEL CELL STACK

BACKGROUND OF THE INVENTION

Field of the Invention

The present invention relates to a method of determining degradation of a fuel cell stack formed by stacking a plurality of power generation cells for performing power generation by electrochemical reactions of a fuel gas and an oxygen-containing gas. Further, the present invention relates to a fuel cell vehicle equipped with the fuel cell stack.

Description of the Related Art

For example, a solid polymer electrolyte fuel cell includes a membrane electrode assembly (MEA) including an electrolyte membrane, an anode provided on one surface of the electrolyte membrane, and a cathode provided on the other side of the electrolyte membrane. The electrolyte membrane is a polymer ion exchange membrane. A membrane electrode assembly is sandwiched between a pair of separators to form a power generation cell (unit cell). Normally, a predetermined number of power generation cells are stacked together to form, e.g., an in-vehicle fuel cell stack mounted in a fuel cell vehicle (fuel cell electric automobile etc.).

In the fuel cell stack, degradation of catalyst used in the fuel cell stack, reduction in the surface area of the catalyst, and reduction in the membrane thickness of the electrolyte membrane may cause degradation of the power generation performance (output performance). It is known that this degradation can be determined from change of the current-voltage characteristics, so called I-V characteristics, of the fuel cell stack.

Japanese Laid-Open Patent Publication No. 2006-351252 (hereinafter referred to as JPA2006-351252) discloses a technique directed to a method of determining degradation of a solid polymer electrolyte fuel cell.

In this technique, based on decrease in the output voltage of a plurality of power generation cells adjacent to the distal end of an anode flow field to which a fuel gas is supplied, degradation of the solid polymer electrolyte fuel cell is determined (paragraphs [0022], [0024], FIGS. 4 and 5 of JPA2006-351252).

SUMMARY OF THE INVENTION

However, in the method of determining degradation of the solid polymer electrolyte fuel cell disclosed in JPA2006-351252 above, it cannot be said that the degradation state of the overall fuel cell stack is always detected accurately.

The present invention has been made taking such problems into account, and an object of the present invention is to provide a method of determining degradation of the fuel cell stack, and a fuel cell vehicle equipped with the fuel cell stack in which the degradation state of a solid polymer electrolyte fuel cell stack can be determined accurately with high reliability.

According to an aspect of the present invention, a method of determining degradation of a fuel cell stack is provided. The fuel cell stack is a solid polymer electrolyte fuel cell stack including a plurality of power generation cells stacked together, the power generation cells being each configured to perform power generation by electrochemical reactions of a fuel gas and an oxygen-containing gas. The method includes the steps of making a comparison to determine whether or not each of a pressure of the oxygen-containing gas supplied to the fuel cell stack, a flow rate of the oxygen-containing gas supplied to the fuel cell stack, a temperature of the fuel cell stack, an impedance of the fuel cell stack, and an output current of the fuel cell stack falls within a predetermined range, measuring an output voltage of the fuel cell stack in a case where each of the pressure and the flow rate of the oxygen-containing gas supplied to the fuel cell stack, and the temperature, the impedance, and the output current of the fuel cell stack falls within the predetermined range, and comparing a measurement value of the output voltage with a reference value to thereby determine a degree of degradation of the fuel cell stack.

According to another aspect of the present invention, a fuel cell vehicle is provided. The fuel cell vehicle is equipped with a solid polymer electrolyte fuel cell stack including a plurality of power generation cells stacked together, the power generation cells being each configured to perform power generation by electrochemical reactions of a fuel gas and an oxygen-containing gas. The fuel cell vehicle includes a measurement instrument that measures each of a pressure of the oxygen-containing gas supplied to the fuel cell stack, a flow rate of the oxygen-containing gas supplied to the fuel cell stack, a temperature of the fuel cell stack, an impedance of the fuel cell stack, an output current of the fuel cell stack, and an output voltage of the fuel cell stack, a comparator that makes a comparison to determine whether or not each of the pressure and the flow rate of the oxygen-containing gas supplied to the fuel cell stack, and the temperature, the impedance, and the output current of the fuel cell stack, measured by the measurement instrument, falls within a predetermined range, and a determiner that, in a case where each of the pressure and the flow rate of the oxygen-containing gas supplied to the fuel cell stack, and the temperature, the impedance, and the output current of the fuel cell stack falls within the predetermined range, compares a measurement value of the output voltage of the fuel cell stack measured by the measurement instrument with a reference value to thereby determine the degree of degradation of the fuel cell stack.

In the present invention, the output voltage of the fuel cell stack which is measured in the case where each of the temperature, the impedance, and the output current of the fuel cell stack falls within the predetermined range, is compared with the reference value to thereby determine the degradation of the fuel cell stack. Therefore, it is possible to determine the degradation state of the solid polymer electrolyte fuel cell stack highly accurately with high reliability.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a method of determining degradation of a fuel cell stack according to the present invention and a fuel cell vehicle equipped with the fuel cell stack will be described with reference to the accompanying drawings.

[Configuration]

Figure 1:
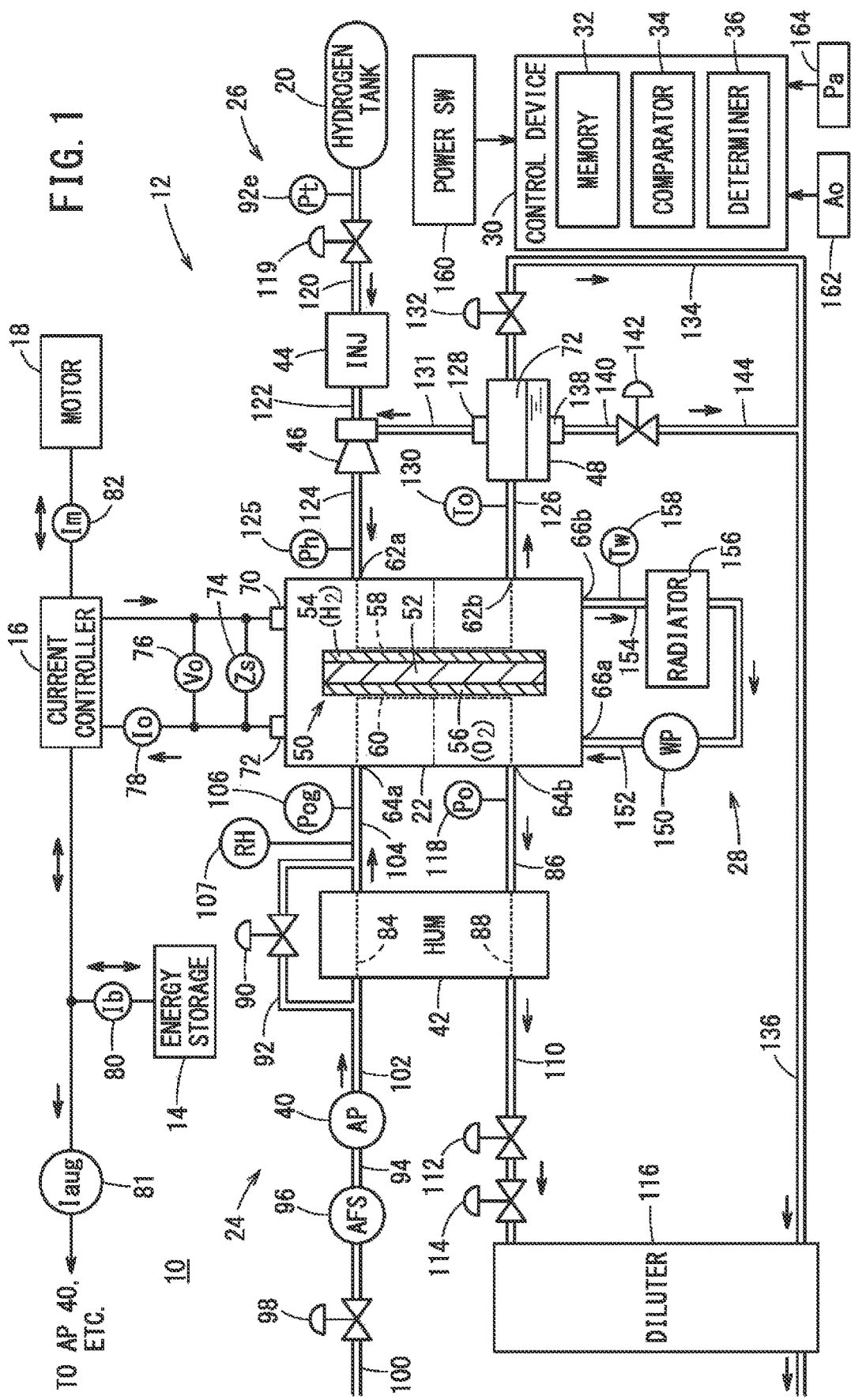
FIG. 1 is a schematic structural diagram showing a fuel cell vehicle according to an embodiment of the present invention for performing a method of determining degradation of the fuel cell stack according to the embodiment.

FIG. 1 is a schematic structural diagram showing a fuel cell vehicle according to an embodiment of the present invention for performing a method of determining degradation of the fuel cell stack according to the embodiment.

For example, as shown in FIG. 1, the fuel cell vehicle 10 according to the embodiment is a fuel cell electric automobile. The fuel cell vehicle 10 includes a fuel cell system 12, an energy storage (electrical storage device) (battery) 14, a current controller 16, a motor (vehicle driving electric motor) 18, a high-pressure hydrogen tank 20, and a control device 30. Examples of the energy storage 14 include a secondary battery and a capacitor.

The control device 30 comprises an ECU (Electronic Control Unit). The control device 30 functions as various control units (control means), etc., such as a comparator 34 and a determiner 36, by a processor (CPU) executing programs recorded in a memory (storage device) 32. Examples of the memory 32 include a volatile memory, a battery-backed volatile memory, a non-volatile memory, and a rewritable non-volatile memory.

The control device 30 obtains data from each of component parts (each of constituent elements) through control lines (not shown), and performs control of the entire fuel cell vehicle 10 (each of the constituent elements) by controlling each part of the fuel cell system 12, including control of the current controller 16.

The fuel cell system 12 includes a fuel cell stack (fuel cell) 22, an oxygen-containing gas system device 24, a fuel gas system device 26, and a coolant supply system device 28.

The oxygen-containing gas system device 24 supplies the oxygen-containing gas to the fuel cell stack 22, and the fuel gas system device 26 supplies the fuel gas to the fuel cell stack 22. The coolant supply system device 28 supplies the coolant to the fuel cell stack 22.

The oxygen-containing gas system device 24 includes an air pump (AP) 40 and a humidifier (HUM) 42. The fuel gas system device 26 includes an injector (INJ) 44, an ejector 46, and a gas liquid separator 48.

The fuel cell stack 22 is made up of a plurality of power generation cells 50 stacked together. For example, each of the power generation cells 50 includes a membrane electrode assembly (MEA), and a pair of separators (not shown) sandwiching the membrane electrode assembly (MEA). The membrane electrode assembly includes a solid polymer electrolyte membrane 52, and an anode 54 and a cathode 56 provided on both sides of the solid polymer electrolyte membrane 52. For example, the solid polymer electrolyte membrane 52 is a thin membrane of perfluorosulfonic acid containing water. A fluorine based electrolyte may be used as the solid polymer electrolyte membrane 52. Alternatively, an HC (hydrocarbon) based electrolyte may be used as the solid polymer electrolyte membrane 52.

Of the pair of separators, one separator facing the anode 54 has an anode flow field 58 as a passage of hydrogen (fuel gas), and the other separator facing the cathode 56 has a cathode flow field 60 as a passage of air (oxygen-containing gas).

The fuel cell stack 22 has a fuel gas supply passage 62a and a fuel gas discharge passage 62b, for supplying a fuel gas (e.g., a hydrogen gas) to the anode 54 through the anode flow field 58.

Further, the fuel cell stack 22 has an oxygen-containing gas supply passage 64a and an oxygen-containing gas discharge passage 64b, for supplying an oxygen-containing gas (e.g., the air) to the cathode 56 through the cathode flow field 60.

Further, the fuel cell stack 22 has a coolant supply passage 66a and a coolant discharge passage 66b as passages of a coolant to each of the power generation cells 50.

The fuel gas is supplied to the anode 54 for producing hydrogen ions from hydrogen molecules through electrode reactions by catalyst, and the hydrogen ions permeate through the solid polymer electrolyte membrane 52 and move to the cathode 56.

On the other hand, electrons released from the hydrogen molecules flow from a negative electrode terminal 70 through the current controller 16, and further flow through loads such as the energy storage 14, the motor 18, the air pump 40, and the control device 30, and also move to the cathode 56 through the current controller 16 and a positive electrode terminal 72.

A measurement instrument (current sensor) 78 for measuring the output current Io [A] flowing from the fuel cell stack 22 in a direction opposite to a direction in which the electrons flow is provided in a wiring line between the positive electrode terminal 72 and the current controller 16.

At the cathode 56, reactions of hydrogen ions and electrons, and oxygen in the supplied oxygen-containing gas occur by operation of the catalyst to thereby produce water.

A measurement instrument (impedance sensor) 74 for measuring the impedance Zs [mmΩ] of the fuel cell stack 22, and a measurement instrument (voltage sensor) 76 for measuring the output voltage Vo [V] of the fuel cell stack 22 are connected between the positive electrode terminal 72 and the negative electrode terminal 70.

It should be noted that since the impedance Zs is correlated to the degree of humidification of the solid polymer electrolyte membrane 52, the impedance Zs is correlated to the system relative humidity (internal relative humidity) of the fuel cell stack 22.

A measurement instrument (current sensor) 82 for measuring motor current (power running current and regenerative current) Im of the motor 18 is provided in a wiring line between the motor 18 and the current controller 16.

The energy storage 14 is provided with a measurement instrument (current sensor) 80 for measuring the battery current Ib, which is a charge and discharge current of the energy storage 14.

A measurement instrument (current sensor) 81 for measuring auxiliary device current Iaug of the air pump 40, etc. is provided in a wiring line between the energy storage 14 and an auxiliary device such as the air pump 40.

In the fuel cell vehicle 10 which is wired as described above, electric energy (power generation electrical energy) of the fuel cell stack 22 and electoral energy of the energy storage 14 (energy storage electrical energy) are consumed for providing electrical energy for the motor 18 as a main device and electrical energy for loads (load electrical energy) for the auxiliary devices such as the air pump 40, an air conditioner, etc. (not shown).

The air pump 40 is made up of a mechanical supercharger, etc. driven by a motor inside the air pump 40. The air pump 40 has functions of taking in and pressurizing the atmospheric air (the air), and supplying the air to the humidifier 42.

The humidifier 42 includes a channel (first channel) 84 as a passage of the oxygen-containing gas (dried air), and a channel (second channel) 88 as a passage of humid exhaust gas (oxygen-containing exhaust gas, cathode off gas) flowing from the cathode flow field 60 of the fuel cell stack 22 through the oxygen-containing gas discharge passage 64b of the fuel cell stack 22 and a pipe channel 86, and has a function of humidifying the oxygen-containing gas supplied from the air pump 40.

That is, the humidifier 42 moves water component contained in the cathode off gas, to the supply gas (oxygen-containing gas) through a porous membrane in the humidifier 42.

The degree of humidification at this time is set to a humidification amount at which the solid polymer electrolyte membrane 52 is humidified such that the fuel cell stack 22 (each of the power generation cells 50) gives an excellent power generation performance.

A bypass channel 92 as a pipe channel having a bypass valve 90 is provided between both ends of the channel 84 of the humidifier 42, for allowing the dried air from the air pump 40 to the fuel cell stack 22 in a manner to bypass the humidifier 42.

The inlet side of the air pump 40 is in communication with the atmospheric air through a pipe channel 94, a measurement instrument {air flow sensor (AFS) (mass flow sensor, flow rate sensor)} 96 for measuring the mass flow rate Mf (g/min) of the oxygen-containing gas, an isolation valve 98 (optional), and a pipe channel 100.

The outlet side of the air pump 40 is connected to one end of the first channel 84 of the humidifier 42 through a pipe channel 102. The other end of the first channel 84 is connected to one end of a supply channel 104 as a pipe channel. The other end of the supply channel 104 is connected to the cathode flow field 60 in the fuel cell stack 22 through the oxygen-containing gas supply passage 64a.

The supply channel 104 of the oxygen-containing gas is provided with a measurement instrument (oxygen-containing gas supply pressure sensor) 106 for detecting the pressure of the oxygen-containing gas flowing through the supply channel 104 as the oxygen-containing gas inlet pressure Pog [kPa], and a measurement instrument (humidification sensor) 107 for detecting the humidity of the oxygen-containing gas flowing though the supply channel 104 as the cathode inlet humidity RH [%].

On the discharge side of the second channel 88 of the humidifier 42, a pipe channel 110 is provided with an outlet stop valve 112, and a diluter 116 is connected to the downstream side of the outlet stop valve 112 through a back pressure control valve 114.

The pipe channel 86 connected to the oxygen-containing gas discharge passage 64b of the fuel cell stack 22 is provided with a measurement instrument (oxygen-containing gas outlet pressure sensor) 118 for detecting the oxygen-containing gas outlet pressure Po.

The hydrogen tank 20 includes a solenoid isolation valve 119, and is a container containing high-purity hydrogen in a high pressure compression state.

The fuel gas discharged from the hydrogen tank 20 flows through a pipe channel 120, the injector 44, the pipe channel 122, the ejector 46, and a pipe channel 124, and is then supplied to the inlet of the anode flow field 58 of the fuel cell stack 22 through the fuel gas supply passage 62a.

The pipe channel 124 is provided with a measurement instrument (the fuel gas inlet pressure sensor) 125 for detecting the fuel gas inlet pressure Ph [kPa]. The injector 44 is driven in a PWM (pulse width modulation) manner by the control device 30, for controlling the fuel gas inlet pressure Ph.

In the coolant supply system device 28, under operation of a coolant pump 150 controlled by the control device 30, a coolant such as pure water, ethylene glycol, or oil is supplied from a coolant circulation channel 152 to the coolant supply passage 66a of the fuel cell stack 22.

The outlet of the anode flow field 58 is connected to the inlet of the gas liquid separator 48 through the fuel gas discharge passage 62b and a pipe channel 126. The fuel exhaust gas (anode off gas), which is the hydrogen-containing gas, is supplied from the anode flow field 58 to the gas liquid separator 48.

The pipe channel 126 connected to the fuel gas discharge passage 62b of the fuel cell stack 22 is provided with a measurement instrument (anode outlet temperature sensor) 130 for detecting the temperature of the anode off gas as the anode outlet temperature To [° C. or K].

The gas liquid separator 48 separates the anode off gas into a gas component and a liquid component (liquid water). The gas component of the anode off gas is discharged from a gas discharge port 128 of the gas liquid separator 48, and moves toward the ejector 46 through a pipe channel 131, and moves toward the diluter 116 through a pipe channel 134 and a pipe channel 136 under opening operation of a purge valve 132.

The fuel gas is supplied from the injector 44 provided upstream of the ejector 46, to the ejector 46 through the pipe channel 122. Therefore, in the state where the gas component of the anode off gas is sucked by the ejector 46 to be mixed with the fuel gas, the gas component of the anode off gas flows through the pipe channel 124, and is then supplied to the anode flow field 58 of the fuel cell stack 22 through the fuel gas supply passage 62a.

When the purge valve 132 is opened, the liquid component of the anode off gas which has flowed from a liquid discharge port 138 of the gas liquid separator 48 through a pipe channel 140, a water discharge valve 142, and a pipe channel 144 is merged with the discharged anode off gas, and then flows through the pipe channel 136, and is discharged to the outside of the fuel cell vehicle 10 through the diluter 116, etc.

After the coolant supplied to the coolant supply passage 66a cools each of the power generation cells 50, the coolant is discharged from the coolant discharge passage 66b. The coolant discharged from the coolant discharge passage 66b flows through a coolant circulation channel 154, and is then cooled by a radiator 156. Further, under operation of the coolant pump 150, the coolant is supplied to the fuel cell stack 22 by circulation.

The coolant circulation channel 154 has a measurement instrument (temperature sensor) 158 for measuring the temperature of the coolant (coolant outlet temperature) Tw, at a position adjacent to the coolant discharge passage 66b.

The fuel cell vehicle 10 is provided with a power switch (power SW) 160 which is an ON/OFF switch. The power switch 160 is operated at the time of starting up operation of the fuel cell vehicle 10 and starting power generation by the fuel cell stack 22, and also operated at the time of stopping power generation, and placing the fuel cell vehicle 10 in a soak (key off) state (stoppage state).

Further, the fuel cell vehicle 10 is provided with an accelerator pedal opening degree sensor 162 as a measurement instrument for detecting the control amount of the accelerator pedal as the accelerator pedal opening degree Ao.

Further, the fuel cell vehicle 10 is provided with an atmospheric pressure sensor 164 as a measurement instrument for detecting the atmospheric pressure Pa.

The power switch 160, the accelerator pedal opening degree sensor 162, and the atmospheric pressure sensor 164 are connected to the control device 30 in the same manner as the other sensors, etc.

Brief Explanation of Operation

Next, a method of determining degradation of the fuel cell stack 22 mounted in the fuel cell vehicle 10 basically having the above structure will be described with reference to a function block diagram in FIG. 2 and a time chart in FIG. 3.

Figure 2:
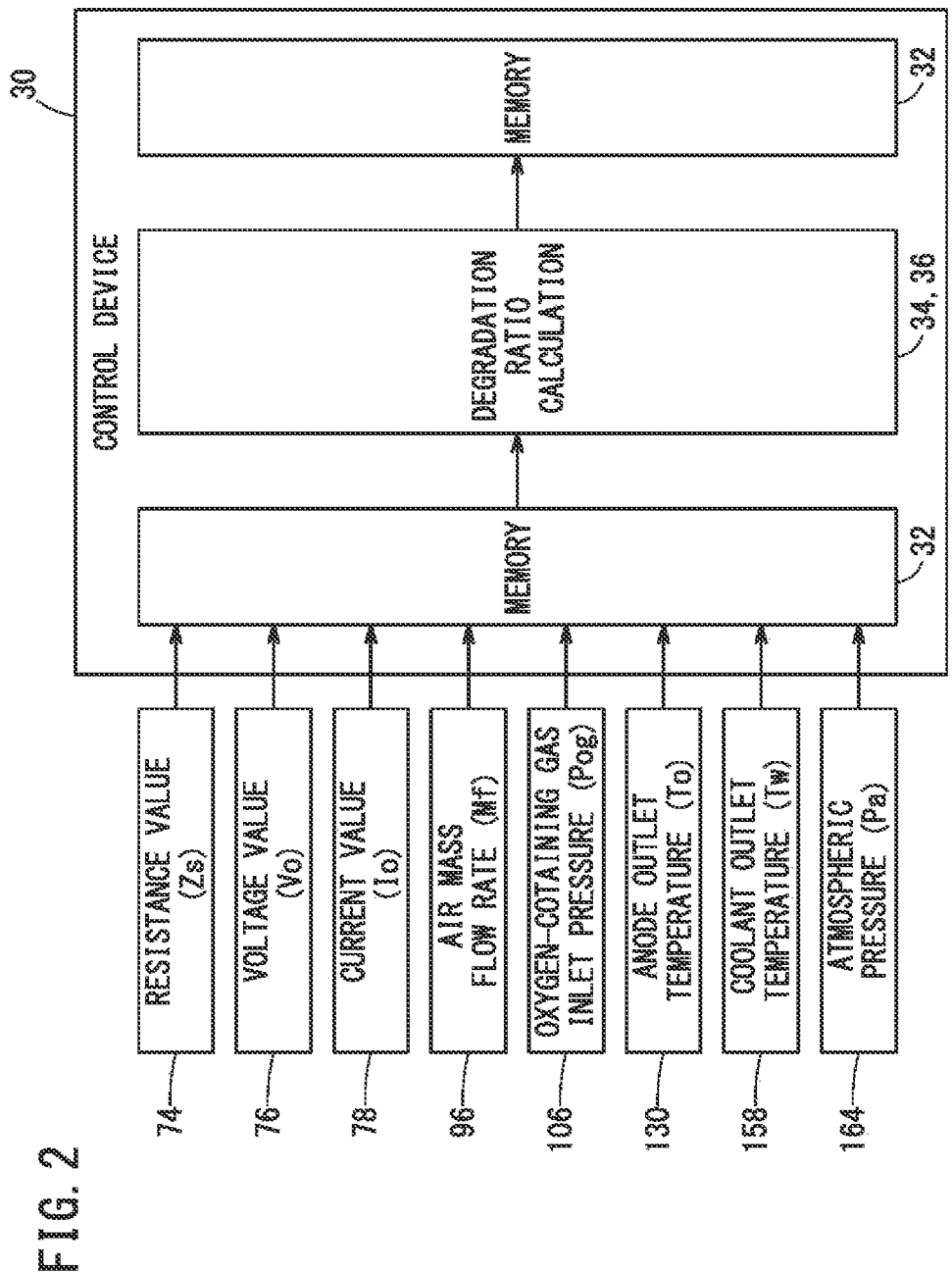
FIG. 2 is a function block diagram showing a control device used for explaining degradation determination.

FIG. 2 shows the functional block diagram of the control device 30 used for explaining degradation determination. FIG. 3 shows the time chart used for explaining degradation determination.

Figure 3:
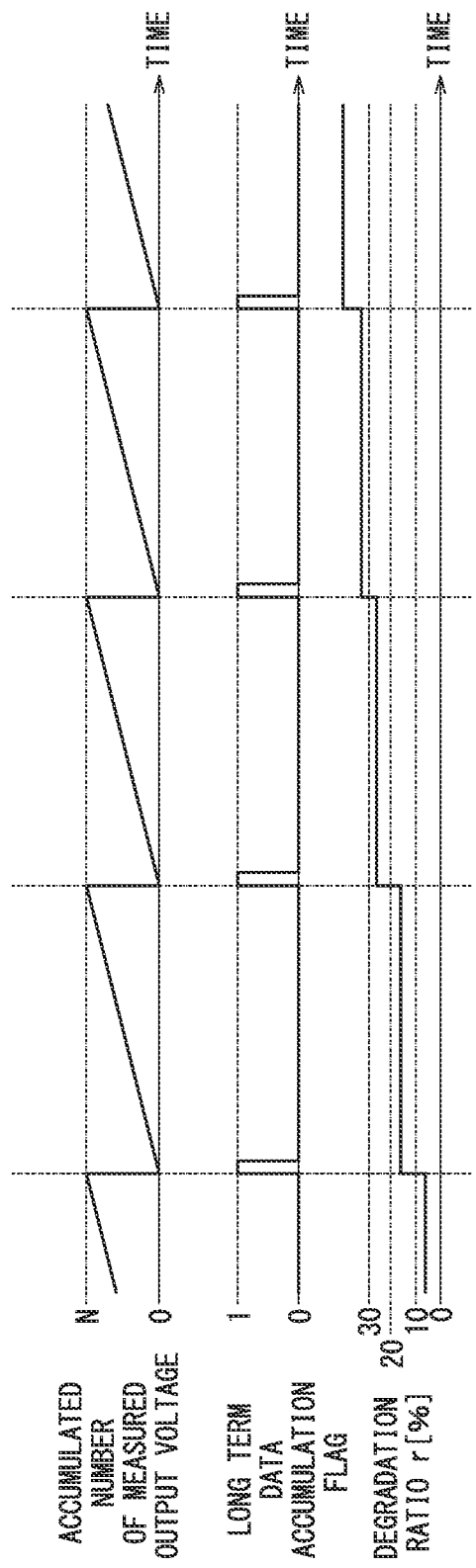
FIG. 3 is a time chart used for explaining the degradation determination.

The upper chart in FIG. 3 shows the accumulated number of the output voltage Vo of the fuel cell stack 22 (accumulated number of times of measurement of output voltage) measured by the voltage sensor 76 when predetermined conditions are satisfied.

The middle chart in FIG. 3 shows an accumulation flag (long term data accumulation flag) which is set (i.e., "0" →"1") when the accumulated number reaches a threshold value (predetermined number of times) N.

The lower chart in FIG. 3 shows an example of the degradation ratio, which is calculated by a determiner 36 of the control device 30 when the accumulation flag is set.

Although an interval at which the accumulation flag shown in the middle chart in FIG. 3 is set is changed based on the travel distance, the travel environment, etc. of the fuel cell vehicle 10, for example, the interval is set to about one month. The accumulation flag is reset (i.e., "1" →"0") when the degradation ratio is calculated.

The control device 30 performs degradation determination (update of the degradation ratio) in a predetermined manner as described later in details, during power generation of the fuel cell stack 22 where the power switch 160 is in the ON state.

That is, at intervals of predetermined time (which is extremely shorter than the intervals at which the accumulation flag is set) during travel, as shown in FIG. 2, the control device 30 obtains the output current (current value) Io, the output voltage (voltage value) Vo, the mass flow rate (air mass flow rate) Mf, the coolant outlet temperature Tw, the impedance (resistance value) Zs, the anode outlet temperature To of the fuel cell stack 22, and the atmospheric pressure Pa as measurement values measured by the respective measurement instruments including the current sensor 78, the voltage sensor 76, the mass flow sensor 96, the temperature sensor 158, and the atmospheric pressure sensor 164, and records the measurement values in the memory 32.

After the measurement values are recorded in the memory 32, the comparator 34 of the control device 30 determines whether or not each of the measurement values excluding the output voltage Vo falls within a predetermined range, and in the case where each of the measurement values falls within the predetermined range, the output voltage Vo is measured and recorded in a non-volatile manner, in the memory 32.

Further, when the number of times that the output voltage Vo is non-volatilely recorded in the memory 32 reaches a predetermined number of times N (see the upper graph in FIG. 3), the determiner 36 of the control device 30 calculates the average value of the output voltages Vo for a predetermined number of times N, and obtains the output voltage Vmean as the average value. The above described predetermined number of times N is set to the number of data at which the average value (average output voltage Vmean) of the output voltage Vo achieves a desired reliability.

Then, based on the average output voltage Vmean, the degradation ratio r showing the change of the fuel cell stack 22 over time is calculated by the determiner 36 of the control device 30.

The degradation ratio r is calculated by the following equation (1).

$$r[\%] = \{1 - (V\text{mean}/V\text{int})\} \times 100 \tag{1}$$

where Vmean represents the average output voltage, and Vint represents an initial output voltage (FIG. 7) described later.

That is, as shown in the lower graph in FIG. 3, the degradation ratio r [%], which is non-volatilely recorded in chronological order in the memory 32, represents the amount of decrease (degree of degradation) of the current average output voltage Vom relative to the initial output voltage Vint of the fuel cell stack 22.

It should be noted that the initial output voltage Vint is measured by the measurement instrument (voltage sensor) 76, e.g., at the time of shipment from a manufacturing factory, and non-volatilely recorded as a reference value in the memory 32.

Detailed Description of Operation

Next, the method of determining degradation of the fuel cell stack 22 according to the embodiment, and the detailed operation of the fuel cell vehicle (vehicle) 10 equipped with the fuel cell stack 22 will be described based on a flow chart shown in FIG. 4. Unless otherwise specified, the processes (control programs) according to the flow chart are performed by (the CPU of) the control device 30. In the following description, for the purpose of brevity, the control device 30 will not be referred to each time a process in the flow chart is explained, and will be referred to as necessary.

In step S1, the control device 30 detects whether or not the power switch 160 of the fuel cell vehicle 10 has been switched from the OFF state to the ON state.

When the control device 30 detects that the power switch 160 has been switched to the ON state (step S1: YES), then, in step S2, power generation operation of the fuel cell vehicle 10 (power generation start) and traveling by controlling the accelerator pedal are started.

In this case, the isolation valve 119 of the hydrogen tank 20 is opened, and the fuel gas is supplied from the hydrogen tank 20 to the anode flow field 58 in the fuel cell stack 22 through the pipe channel 120, the injector 44, the pipe channel 122, the ejector 46, the pipe channel 124, and the fuel gas supply passage 62*a*.

At the same time, operation of the air pump 40 is started, and the oxygen-containing gas taken in from the atmosphere by the air pump 40 is supplied to the cathode flow field 60 in the fuel cell stack 22 through the pipe channel 100, the opened isolation valve 98, the mass flow sensor 96, the pipe channel 94, the air pump 40, the channel 84 of the humidifier 42, the supply channel 104, and the oxygen-containing gas supply passage 64*a*.

As a result, the fuel gas and the oxygen-containing gas (both reactant gases) are consumed in electrochemical reaction (power generation reaction) at the anode catalyst of the anode 54 and the cathode catalyst of the cathode 56 for performing power generation.

In this case, the motor 18 is driven through the current controller 16 in accordance with the accelerator pedal opening degree Ao from the accelerator pedal opening degree sensor 162 by operation of the accelerator pedal, whereby the fuel cell vehicle 10 travels in accordance with the accelerator pedal opening degree Ao. The redundant power generation electrical energy of the fuel cell stack 22 and the regenerative electrical energy of the motor 18 are stored in the energy storage 14 through the current controller 16.

After the oxygen-containing gas is supplied to the cathode 56, the oxygen is partially consumed at the cathode 56. That is, the cathode off gas containing water (water components) produced in the reaction in the fuel cell stack 22 is discharged from the oxygen-containing gas discharge passage 64*b*. The discharged cathode off gas flows through the pipe channel 86, and then humidifies, through the channel 88 of the humidifier 42, the oxygen-containing gas supplied from the air pump 40 to the fuel cell stack 22 through the channel 84 of the humidifier 42.

Further, after having flowed through the channel 88 of the humidifier 42, the cathode off gas flows through the pipe channel 110, the opened outlet stop valve 112, and the back pressure control valve 114, and is then discharged to the outside through the diluter 116.

In the meanwhile, part of the fuel gas that has not been consumed at the anode 54 (unconsumed portion) is discharged as the anode off gas of the fuel cell stack 22 from the fuel gas discharge passage 62*b* into the pipe channel 126, and thereafter supplied into the gas liquid separator 48.

By the gas liquid separator 48, the anode off gas is separated into an exhaust gas as a gas component and a discharge fluid as a liquid component (liquid water). At this time, when the water discharge valve 142 is in a closed state, the discharge fluid is retained on the upstream side of the water discharge valve 142.

In this case, the fuel gas is injected from the injector 44 toward the upstream side of the ejector 46. Thus, negative pressure is generated in the pipe channel 131. Therefore, the exhaust gas separated by the gas liquid separator 48 is sucked into the ejector 46 through the pipe channel 131, and mixed with the fuel gas supplied to the pipe channel 122. Therefore, the mixed gas is discharged into the pipe channel 124 on the downstream side of the ejector 46.

That is, after the unconsumed portion, which has not been consumed in the power generation reaction, is discharged as the anode off gas from the anode 54, the liquid water is removed from the anode off gas, and the anode off gas with water being removed is discharged as the exhaust gas. The exhaust gas is mixed with the fuel gas newly supplied to the pipe channel 122. Then, the mixed gas is supplied again, to the anode 54.

It should be noted that when more than a predetermined amount of fluid is stored in the gas liquid separator 48 during power generation, the water discharge valve 142 is opened to achieve a predetermined liquid level.

During power generation operation (traveling) in step S2 as described above, in step S3, in order to reliably obtain a relatively short and suitable measurement time period (measurement time) tm of predetermined time, e.g., about 10 [seconds], regardless of operation of the accelerator pedal, the control device 30 maintains the output current Io of the fuel cell stack 22 at a constant output current Iconst within the range of several [%] to 50 [%] which is not more than half of the maximum value.

In this case, the control device 30 performs controls in a manner that increase/decrease of the motor current Im which changes depending on the accelerator pedal opening degree Ao is compensated by increase/decrease of the battery current Ib which is a charge and discharge current of the energy storage 14, to thereby maintain the value of the output current Io of the fuel cell stack 22 at predetermined constant output current Iconst.

More specifically, as shown by the following equation (2), the load current (required load current) IL required for the fuel cell vehicle 10 is compensated by the battery current Ib and the output current Io of the fuel cell stack 22. The required load current IL is a value obtained by adding the auxiliary device current Iaug to the motor current Im.

$$Ib+Io=IL=Im+Iaug \quad (2)$$

where Ib represents the battery current, Io represents the output current, Im represents the motor current, and Iaug represents the auxiliary device current. The sign "+" of the motor current Im represents a power running current, and the sign "−" of the motor current Im represents a regenerative current. The sign "+" of the battery current Ib represents a discharge current, and the sign "−" of the battery current Ib represents a charge current.

Since the equation (2) can be transformed into Io=IL−Ib, it can be understand that the battery current Ib should be increased/decreased by (change amount) ΔIb in correspondence with the increase/decrease by (change amount) ΔIL of the load current IL in order to maintain the output current Io at the constant output current Iconst (Io=Iconst). That is, by compensating the shortage/excess of the required load current IL by the increase/decrease of the battery current Ib, it is possible to maintain the output current Io of the fuel cell stack 22 at the constant output current Iconst.

While the control device 30 maintains the output current Io of the fuel cell stack 22 at a constant output current Iconst, in step S4, the control device 30 measures the measurement values (the mass flow rate Mf, the oxygen-containing gas inlet pressure Pog, the water temperature (coolant outlet temperature) Tw, the impedance Zs, and the atmospheric pressure Pa) by the measurement instruments (the mass flow sensor 96, the pressure sensor 106, the temperature sensor 158, the impedance sensor 74, and the atmospheric pressure sensor 164), excluding the output voltage Vo of the fuel cell stack 22 measured by the voltage sensor 76, and stores the measurement values temporarily in the memory 32 (see FIG. 2).

Figure 5:
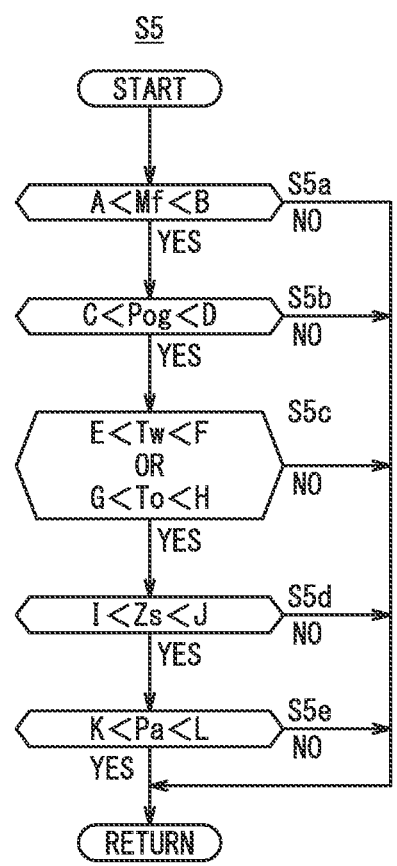
FIG. 5 is a flow chart used for detailed explanation of step S5 in the flow chart in FIG. 4.

Then, in step S5, the comparator 34 determines whether or not each of the measurement values (Mf, Pog, Tw, To, Zs, and Pa) measured in step S4 is within a predetermined range (threshold range). FIG. 5 is a flow chart showing the details of step S5.

Specifically, in steps S5*a*, S5*b*, S5*c*, S5*d*, and S5*e*, the comparator 34 makes a comparison to determine whether or not the mass flow rate Mf is between a threshold A and a threshold B (A<Mf<B), whether or not the oxygen-containing gas inlet pressure Pog is between a threshold value C and a threshold vale D (C<Pog<D), whether or not the water temperature (coolant outlet temperature) Tw is between a threshold value E and a threshold value F (E<Tw<F) or whether or not the anode outlet temperature To is between a threshold G and a threshold H (G<To<H), whether or not the impedance Zs is between a threshold I and a threshold J (I<Zs<J), and whether or not the atmospheric pressure Pa is between a threshold value K and a threshold value L (K<Pa<L).

If any of the determination results in steps S5a to S5e is negative (i.e., in a case where at least one of the results in steps S5a to S5e is NO), determination of step S5 is regarded as negative (step S5: NO), and the routine returns to step S1. It should be noted that, also in a case where determination in step S3 is negative, the routine returns to step S1. When the routine returns to step S1, it is determined whether or not the ON state of the power switch 160 is continued. If the ON state of the power switch 160 is continued, the routine proceeds to step S2. If the power switch 160 is placed in the OFF state, the process is finished. In this case, in step S2, power generation of the fuel cell stack 22 is continued, and the fuel cell vehicle 10 is regarded as being in a state of traveling (travel enabled state), and the routine proceeds to the processes in step S3 and the subsequent steps.

In a case where all of the determination results in steps S5a to S5e are positive (step S5a to S5e: YES), it is determined that measurement conditions obtained by measurement instruments (the mass flow sensor 96, the pressure sensor 106, the temperature sensor 158, the impedance sensor 74, and the atmospheric pressure sensor 164) and measurement conditions of the initial output voltage Vint (see FIG. 7) are the same conditions (predetermined conditions), and determination in step S5 (FIGS. 4 and 5) is regarded as positive (step S5: YES), and the routine proceeds to step S6 (FIG. 4).

In step S6, the output voltage Vo (Io=Iconst) of the fuel cell stack 22 is measured by the voltage sensor 76 during the measurement time tm, and non-volatilely recorded in the memory 32 as a measurement value having high reliability. Also within this measurement time tm, in order to increase the reliability, the average value obtained in a plurality of measurements may be used as the output voltage Vo.

Figure 6:
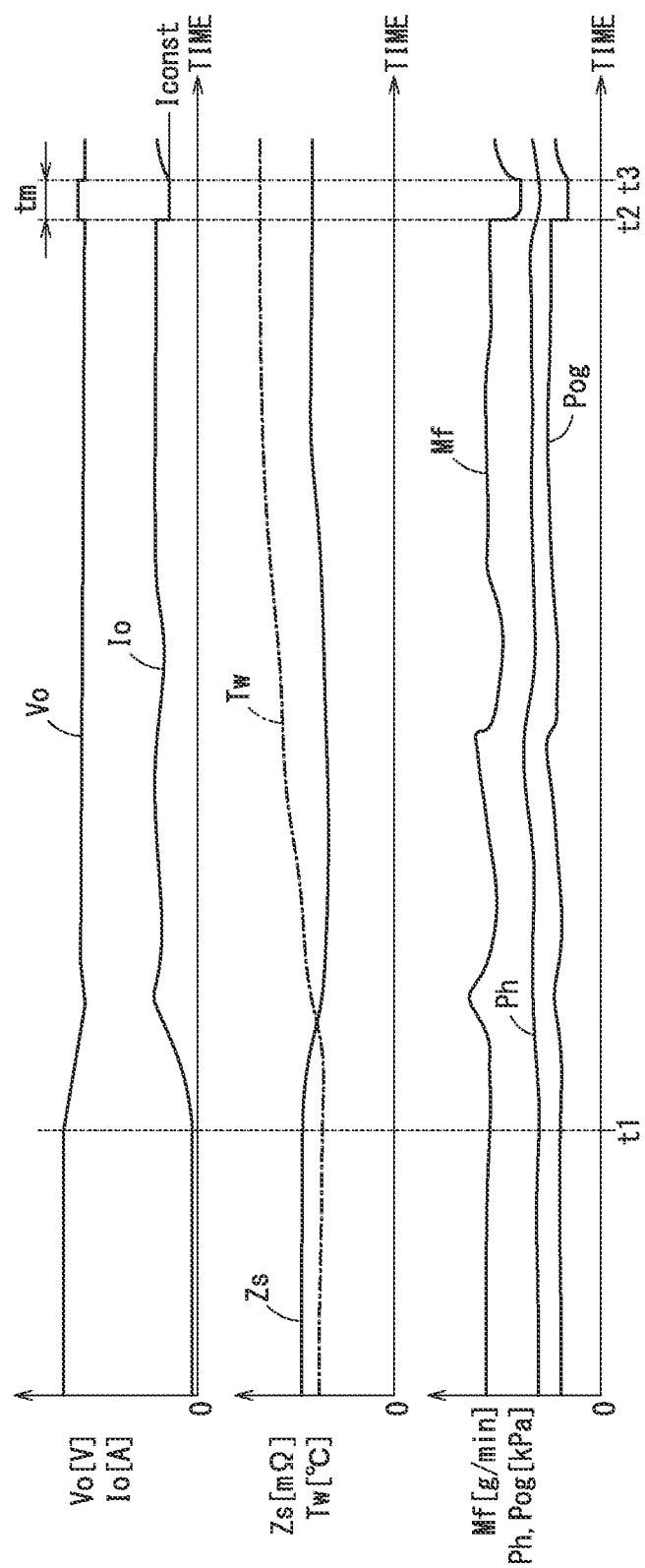
FIG. 6 is a time chart used for explanation of the measurement time (measurement timing) of measuring the output voltage of the fuel cell stack mounted in the fuel cell vehicle according to the embodiment.

FIG. 6 is a time chart which is an example used for explanation of the measurement time (measurement timing) tm in steps S4 and S6.

The characteristics in FIG. 6 show, for example, at the time point t2, in the order from upper to lower, the output voltage Vo, the output current Io, the coolant outlet temperature Tw, the impedance Zs, the mass flow rate Mf, the fuel gas inlet pressure Ph, and the oxygen-containing gas inlet pressure Pog during power generation of the fuel cell stack 22, respectively.

In the example of FIG. 6, at a time point t1, the accelerator pedal is operated to start travel, and during the measurement time tm between a time point t2 and a time point t3, the output current Io is maintained at the constant output current Iconst, and the output voltage Vo during power generation operation of the fuel cell stack 22 is measured, and non-volatilely recorded in the memory 32 (step S6).

Figure 4:
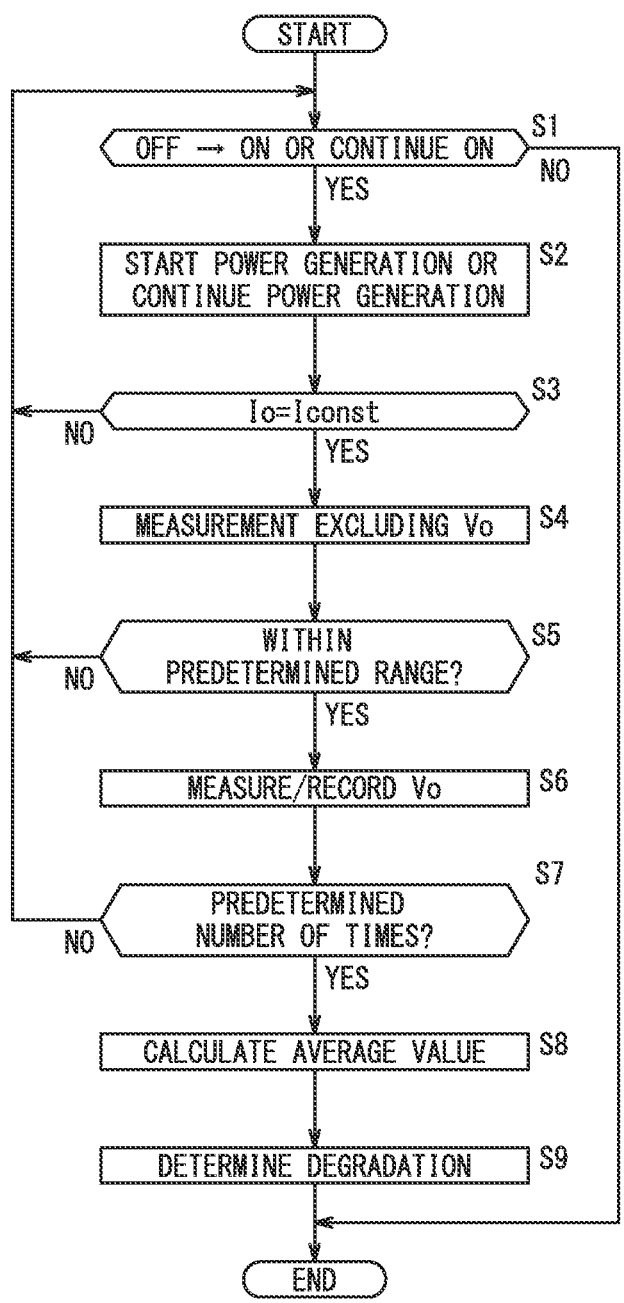
FIG. 4 is a flow chart used for detailed explanation of the degradation determination method.

Then, in step S7 of a flow chart in FIG. 4, it is determined whether or not the number of measurements of the output voltage Vo (accumulated number of the measurement output voltage) non-volatilely recorded in the memory 32 as a measurement value having high reliability has reached a threshold value (predetermined number of times) N (see FIG. 3).

In a case where the number of measurements is less than the threshold value (predetermined number of times) N, the routine of step S1 (YES)→step S2→step S3 (YES)→step S4→step S5 (YES)→step S6→step S7 (NO) is repeated until the number of measurements reaches the threshold value (predetermined number of times) N, and the fuel cell vehicle 10 repeats soaking (stoppage) {step S1 (NO)→step S1 (ON)} and traveling {step S1 (continue ON), step S2 (continue power generation)}.

In a case where the number of measurements reaches the threshold value (predetermined number of times) N (step S7: YES), and a long term data threshold flag is set (see FIG. 3), then in step S8, the determiner 36 determines (calculates) the average value (average output voltage Vmean) of the output voltage Vo (when Io=Iconst) measured predetermined number of times N within the predetermined period.

Further, in step S9, the determiner 36 makes a degradation determination, and the control device 30 finishes the process. In step S9, the determiner 36 calculates the degradation ratio r described using the above equation (1).

For example, the thus-determined degradation ratio r of the fuel cell stack 22 is increased stepwise at intervals of the accumulation number N, as shown in the characteristics shown in the lower chart in FIG. 3, and actually increased gradually over time.

Figure 7:
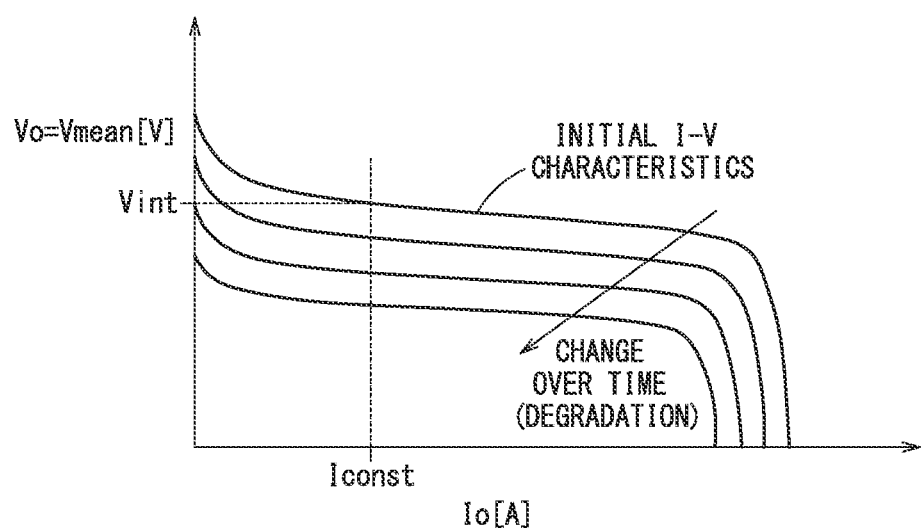
FIG. 7 is graph showing a characteristic curve used for explanation of change (degradation) of I-V characteristics over time.

As shown in FIG. 7, in the I-V characteristics of the fuel cell stack 22, in comparison with the initial I-V characteristics, the average output voltage Vmean of the fuel cell stack 22 is gradually decreased due to change (degradation) over time, for example, under a constant output current Iconst.

[First Modification]

In the above embodiment, as the system temperature (internal temperature) of the fuel cell stack 22, the water temperature (coolant outlet temperature) Tw is used. However, the present invention is not limited in this respect. The temperature (anode outlet temperature) To of the anode off gas, which is an exhaust fuel gas discharged from the fuel cell stack 22, measured by the anode outlet temperature sensor 130, which is a measurement instrument, may be used.

[Second Modification]

Further, in the state where the output current Io is maintained at a constant output current Iconst (step S3: YES), when each of the measurement values (the mass flow rate Mf, the oxygen-containing gas inlet pressure Pog, the water temperature (coolant outlet temperature) Tw, the anode outlet temperature To, the impedance Zs, the atmospheric air pressure Pa) measured by the measurement instruments (the mass flow sensor 96, the pressure sensor 106, the temperature sensor 158, the impedance sensor 74, and the atmospheric pressure sensor 164) falls within a predetermined range (step S5: YES), the output voltage Vo is measured (step S6). Instead of measuring the output voltage Vo at a single constant output current Iconst, by changing (increasing/decreasing) the constant output current Iconst and taking multiple measurements of the output value Vo at multiple constant output currents Iconst, it becomes possible to determine the degradation state of the I-V characteristics more accurately.

It should be noted that, when the atmospheric pressure Pa falls out of a predetermined range (e.g., falls out of the range of 95 kPa to 104.3 kPa), the internal resistance of the fuel cell stack 22 is increased due to the fact that the solid polymer electrolyte membrane 52 tends to be dried. As a result, the output voltage Vo is decreased, and the reliability (accuracy) of the measurement value is lowered.

[Third Modification]

In the above embodiment, the atmospheric pressure Pa is measured and obtained by the atmospheric pressure sensor 164 mounted to the fuel cell vehicle 10. However, the present invention is not limited in this respect. For example, the control device 30 uses satellite positioning equipment such as a GPS unit of a navigation apparatus (not shown) to recognize (detect) the user's own vehicle position (three-dimensional position on a map including the altitude).

Then, based on the detected altitude of the user's own vehicle position and (the value of) 0-m atmospheric pressure (atmospheric pressure at an altitude of zero meters) in weather information obtained through a communication unit (not shown), the pressure of the atmosphere (atmospheric air) Pa at the altitude of the user's own vehicle position may be calculated. In this case, the control device 30, the GPS unit, and the communication unit function as an atmospheric pressure obtainer.

[Fourth Modification]

In the above embodiment, degradation is determined based on the average output voltage Vmean. However, the present invention is not limited in this respect. Degradation determination having certain accuracy can be made by comparing the output voltage Vo (measurement value) measured in step S6 with the output voltage Vo obtained from the initial I-V characteristics as a reference value.

[Fifth Modification]

In the above embodiment, for the determination degradation, calculation of the average value (average output voltage Vmean) of the measurement values of the output voltage Vo of the fuel cell stack 22 is performed each time the number of measurements reaches the predetermine number of times N in step S7 (FIG. 4). However, the present invention is not limited in this respect. The calculation of the average value of the measurement values of the output voltage Vo of the fuel cell stack 22 may be performed at intervals of a predetermined time period, e.g., about one month.

[Applications]

The degradation state of the fuel cell stack 22 (e.g., the degradation ratio [%] in the lower chart in FIG. 3) may be displayed on a display panel on the dashboard of the fuel cell vehicle 10, and shown to users, or may be fed back to dealers, manufactures, and resellers, etc. through communication means (not shown).

Invention Understood from the Embodiments

Hereinafter, the invention which can be understood from the above described embodiments and modifications will be described. It should be noted that, for the purpose of brevity, although constituent elements are labeled with the reference numerals used in the above embodiments, the constituent elements are not limited to those labelled with the reference numerals.

The present invention provides the method of determining degradation of the fuel cell stack 22. The fuel cell stack 22 is a solid polymer electrolyte fuel cell stack 22 including a plurality of power generation cells 50 stacked together, each configured to perform power generation by electrochemical reactions of a fuel gas and an oxygen-containing gas. The method includes the steps of making a comparison to determine whether or not each of the pressure Pog of the oxygen-containing gas supplied to the fuel cell stack 22, the flow rate Mf of the oxygen-containing gas supplied to the fuel cell stack 22, the temperature Tw of the fuel cell stack 22, the impedance Zs of the fuel cell stack 22, and the output current Io of the fuel cell stack 22 falls within a predetermined range (step S5), measuring the output voltage Vo of the fuel cell stack 22 in the case where each of the pressure and the flow rate of the oxygen-containing gas supplied to the fuel cell stack 22, and the temperature, the impedance, and the output current of the fuel cell stack 22 falls within the predetermined range (step S6), and comparing a measurement value Vo of the output voltage with a reference value to thereby determine the degree of degradation of the fuel cell stack 22.

In the present invention, the output voltage of the fuel cell stack 22 is measured in the case where each of the temperature, the impedance, and the output current of the fuel cell stack 22 is within the predetermined range, and the measured output voltage of the fuel cell stack 22 is compared with the reference value to determine the degree of degradation of the fuel cell stack 22. Therefore, measurements are performed under the same measurement conditions (preconditions), and it is possible to determine the degree of degradation accurately.

In this case, further, the atmospheric pressure is obtained, and in the case where the obtained atmospheric pressure falls within a predetermined range, the output voltage of the fuel cell stack 22 is measured. In this manner, it is possible to increase the accuracy of determining the degree of degradation.

It should be noted that an average value of values obtained by making a plurality of measurements may be used as the measurement value. In this manner, it is possible to determine the degree of degradation with high reliability.

Further, the fuel cell stack 22 is mounted in the fuel cell vehicle 10 configured to travel while the fuel cell stack 22 is performing power generation. The fuel cell vehicle 10 includes the energy storage 14. The output voltage Vo of the fuel cell stack 22 is measured in the state where a charge and discharge current Ib of the energy storage 14 is controlled in a manner that the output current Io of the fuel cell stack 22 is kept constant relative to a required load current IL of the fuel cell vehicle 10 (Io=Iconst). In this manner, it is possible to accurately determine degradation of the fuel cell stack 22 mounted in the fuel cell vehicle 10.

The present invention also provides the fuel cell vehicle 10 equipped with the solid polymer electrolyte fuel cell stack 22 including the plurality of power generation cells 50 stacked together, the power generation cells being each configured to perform power generation by electrochemical reactions of a fuel gas and an oxygen-containing gas. The fuel cell vehicle 10 includes the measurement instrument configured to measure each of the pressure Pog of the oxygen-containing gas supplied to the fuel cell stack 22, the flow rate Mf of the oxygen-containing gas supplied to the fuel cell stack 22, the temperature To (or Tw) of the fuel cell stack 22, the impedance Zs of the fuel cell stack 22, the output current Io of the fuel cell stack 22, and the output voltage Vo of the fuel cell stack 22, the comparator 34 configured to make a comparison to determine whether or not each of the pressure Pog and the flow rate Mf of the oxygen-containing gas supplied to the fuel cell stack 22, and the temperature To (or Tw), the impedance Zs, and the output current Io of the fuel cell stack 22, measured by the measurement instrument, falls within a predetermined range, and the determiner 36 configured to, in the case where each of the pressure Pog and the flow rate Mf of the oxygen-containing gas supplied to the fuel cell stack 22, and the temperature To (or Tw), the impedance Zs, and the output current Io of the fuel cell stack 22 measured by the measurement instrument falls within the predetermined range, compare a measurement value of the output voltage Vo of the fuel cell stack 22 measured by the measurement instrument with a reference value Vint to thereby determine the degree of degradation of the fuel cell stack 22.

In the present invention, the output voltage Vo of the fuel cell stack 22 measured in the case where each of the temperature To (or Tw), the impedance Zs, and the output current Io of the fuel cell stack 22 mounted in the fuel cell vehicle 10 falls within the predetermined range is compared with the reference value Vint to thereby determine the degree of degradation of the fuel cell stack 22. Therefore, measurements are performed under the same measurement conditions (preconditions), and it is possible to determine the degree of degradation accurately.

In this case, further, the atmospheric pressure obtainer configured to obtain the atmospheric pressure Pa is provided, and in the case where the obtained atmospheric pressure Pa falls within a predetermined range (K<Pa<L), a measurement value of the output voltage Vo of the fuel cell stack 22 is obtained. In this manner, it is possible to determine the degree of degradation more accurately.

Further, the fuel cell vehicle 10 includes the current controller 16 configured to control a charge and discharge current Ib of the energy storage 14 in a manner that the output current Io of the fuel cell stack 22 is kept constant (Io=Iconst) relative to a required load current IL of the fuel cell vehicle 10, and the output voltage Vo of the fuel cell stack 22 is measured in the state where the charge and discharge current Ib of the energy storage 14 is controlled. In this manner, it is possible to determine degradation of the fuel cell stack 22 mounted in the fuel cell vehicle 10 more accurately.

It should be noted that the present invention is not limited to the above embodiment. It is a matter course that various structures can be adopted based on the description of this specification.

What is claimed is:

1. A method of determining degradation of a solid polymer electrolyte fuel cell stack located on a vehicle, wherein the fuel cell stack includes a plurality of power generation cells stacked together, the power generation cells being each configured to perform power generation by electrochemical reactions of a fuel gas and an oxygen-containing gas, the method comprising:
storing, by a device comprising a processor, output characteristics of an initial state of the fuel stack as a reference value;
measuring, by the device, each of a pressure of the oxygen-containing gas supplied to the fuel cell stack, a flow rate of the oxygen-containing gas supplied to the fuel cell stack, a temperature of the fuel cell stack, an impedance of the fuel cell stack, an output current of the fuel cell stack, and an output voltage of the fuel cell stack;
comparing, by the device, each of the measured pressure of the oxygen-containing gas supplied to the fuel cell stack, the measured flow rate of the oxygen-containing gas supplied to the fuel cell stack, the measured temperature of the fuel cell stack, the measured impedance of the fuel cell stack, the measured output current of the fuel cell stack, and the measured output voltage of the fuel cell stack, with a predetermined range;
in response to determining that, only in a case where each of the measured pressure of the oxygen-containing gas supplied to the fuel cell stack, the flow rate of the oxygen-containing gas supplied to the fuel cell stack, the measured temperature of the fuel cell stack, the measured impedance of the fuel cell stack, the measured output current of the fuel cell stack falls within the predetermined range, comparing, by the device, the measured output voltage of the fuel cell stack with the-reference value to facilitate determining, by the device, a degree of degradation of the fuel cell stack;
measuring, by the device, an atmospheric pressure; and
only in a case where each of the measured pressure of the oxygen-containing gas supplied to the fuel cell stack, the measured flow rate of the oxygen-containing gas supplied to the fuel cell stack, the temperature of the fuel cell stack, the impedance of the fuel cell stack, and the output current of the fuel cell stack, and the measured atmospheric pressure falls within a predetermined range, a measurement value of the output voltage of the fuel cell stack is determined, by the device.

2. The method of determining degradation of the fuel cell stack according to claim 1, wherein the measured output voltage of the fuel cell stack is an average value of values obtained, by the device, by making a plurality of measurements.

3. The method of determining degradation of the fuel cell stack according to claim 1, wherein the fuel cell stack is mounted in the vehicle that travels while the fuel cell stack is performing power generation;
the vehicle comprises an energy storage; and
the output voltage of the fuel cell stack is measured, by the device, in a state where a charge and discharge current of the energy storage is controlled in a manner that the output current of the fuel cell stack is kept constant relative to a required load current of the vehicle.

4. A fuel cell vehicle equipped with a solid polymer electrolyte fuel cell stack including a plurality of power generation cells stacked together, the power generation cells being each configured to perform power generation by electrochemical reactions of a fuel gas and an oxygen-containing gas, the fuel cell vehicle comprising:
a processor; and
a memory that stores executable instructions that, when executed by the processor, are configured to perform the following operations:
storing output characteristics of an initial state of the fuel stack as a reference value;
measuring each of a pressure of the oxygen-containing gas supplied to the fuel cell stack, a flow rate of the oxygen-containing gas supplied to the fuel cell stack, a temperature of the fuel cell stack, an impedance of the fuel cell stack, an output current of the fuel cell stack, and an output voltage of the fuel cell stack;
comparing each of the measured pressure and the flow rate of the oxygen-containing gas supplied to the fuel cell stack, the measured temperature, the measured impedance, the measured output current of the fuel cell stack, and the measured output voltage of the fuel cell stack, with a predetermined range; and
in response to determining that, only in a case where each of the measured pressure and the flow rate of the oxygen-containing gas supplied to the fuel cell stack, the measured temperature, the measured impedance, and the measured output current of the fuel cell stack falls within the predetermined range, comparing the measured output voltage of the fuel cell stack with the reference value to facilitate determining a degree of degradation of the fuel cell stack;

measuring an atmospheric pressure; and only in a case where each of the pressure and the flow rate of the oxygen-containing gas supplied to the fuel cell stack, the temperature, the impedance and the output current of the fuel cell stack, and the measured atmospheric pressure falls within a predetermined range, a measurement value of the output voltage of the fuel cell stack is determined.

5. The fuel cell vehicle of claim 4, wherein the operations further comprise controlling a charge and discharge current of an energy storage in a manner that the output current of the fuel cell stack is kept constant relative to a required load current of the fuel cell vehicle, wherein the output voltage of the fuel cell stack is measured in a state where the charge and discharge current of the energy storage is controlled.

\* \* \* \* \*